(No Model.)
2 Sheets—Sheet 1.

J. H. LONG.
DEVICE FOR RETARDING THE DESCENT OF FALLING BODIES.

No. 285,283. Patented Sept. 18, 1883.

Witnesses.

Lewis Tomlinson

F. B. Fetherstonhaugh

Inventor.

John H. Long by Donald C. Ridout & Co.

Attorneys (No Model.)  2 Sheets—Sheet 2.

J. H. LONG.
DEVICE FOR RETARDING THE DESCENT OF FALLING BODIES.

No. 285,283. Patented Sept. 18, 1883.

Witnesses.
Lewis Tomlinson
J. B. Fetherstonhaugh

Inventor.
John H. Long
by Donald C. Ridout
Attorneys

United States Patent Office.

JOHN H. LONG, OF WALKERTON, ONTARIO, CANADA.

DEVICE FOR RETARDING THE DESCENT OF FALLING BODIES.

SPECIFICATION forming part of Letters Patent No. 285,283, dated September 18, 1883.

Application filed April 3, 1883. (No model.)

*To all whom it may concern:*

Be it known that I, JOHN HENRY LONG, a subject of the Queen of Great Britain, residing at the town of Walkerton, in the county of Bruce, in the Province of Ontario, Canada, have invented a certain new and useful Device for Retarding the Descent of Falling Bodies, of which the following is a specification.

My invention relates to a device for retarding the descent of falling bodies, and is more particularly designed to be used as a fire-escape. The object of the invention is to devise a simple and cheaply-made device by which a chain, rope, or wire carrying a weight may be paid out at any desired speed and regulated to support any required weight; and it consists in the peculiar construction, arrangement, and combination of parts, as hereinafter more fully described and claimed.

Figure 1:
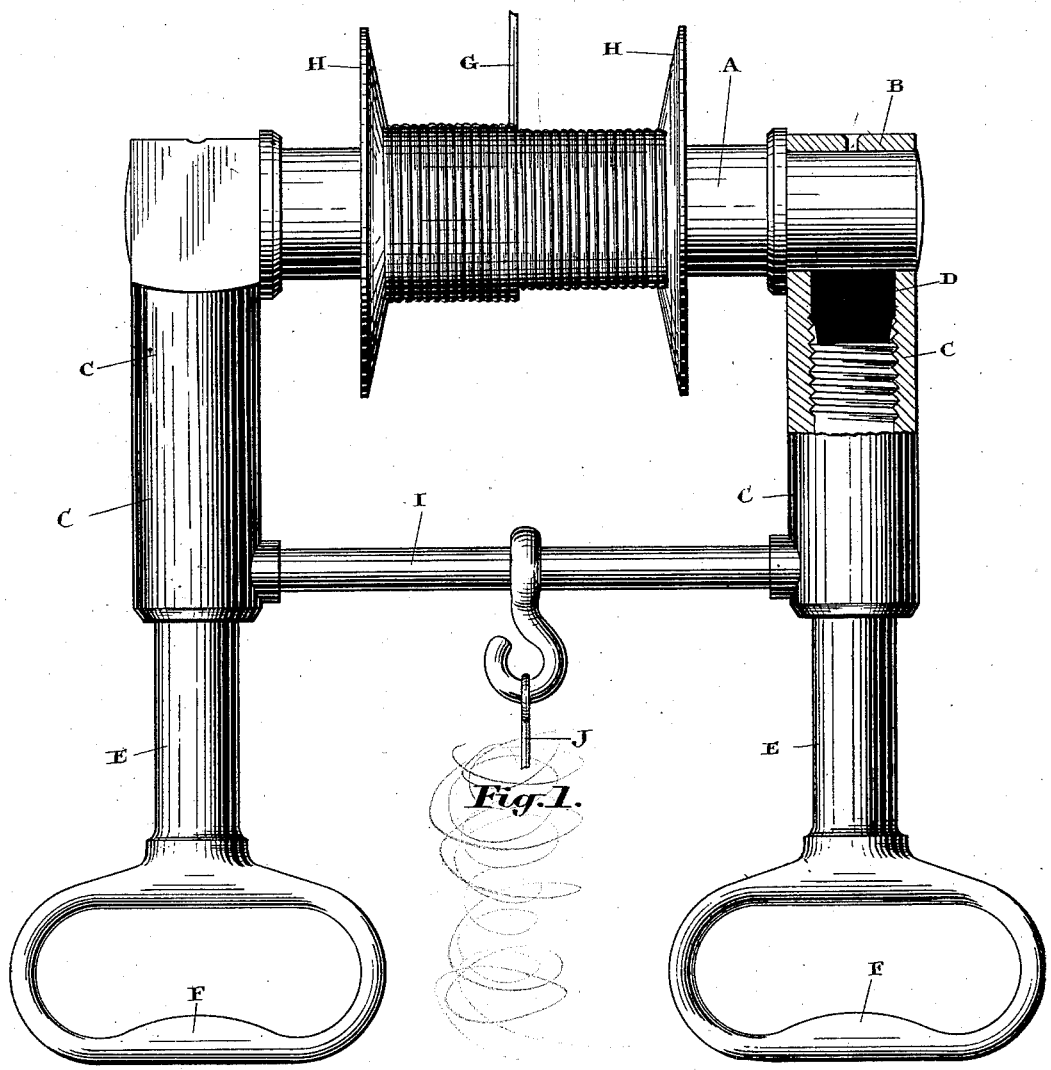
Figure 2:
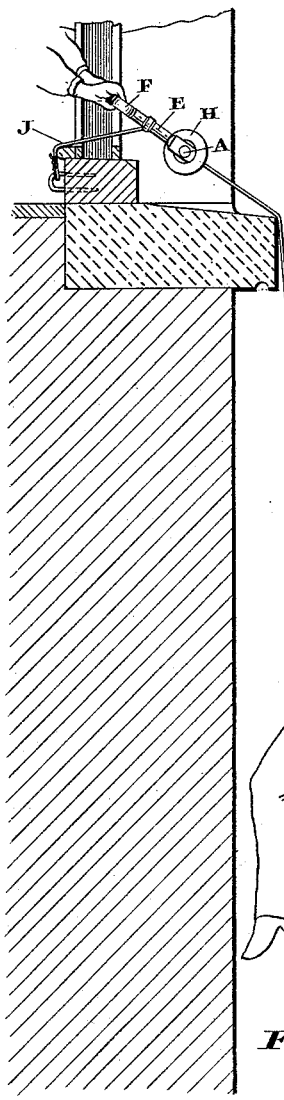
Figure 3:
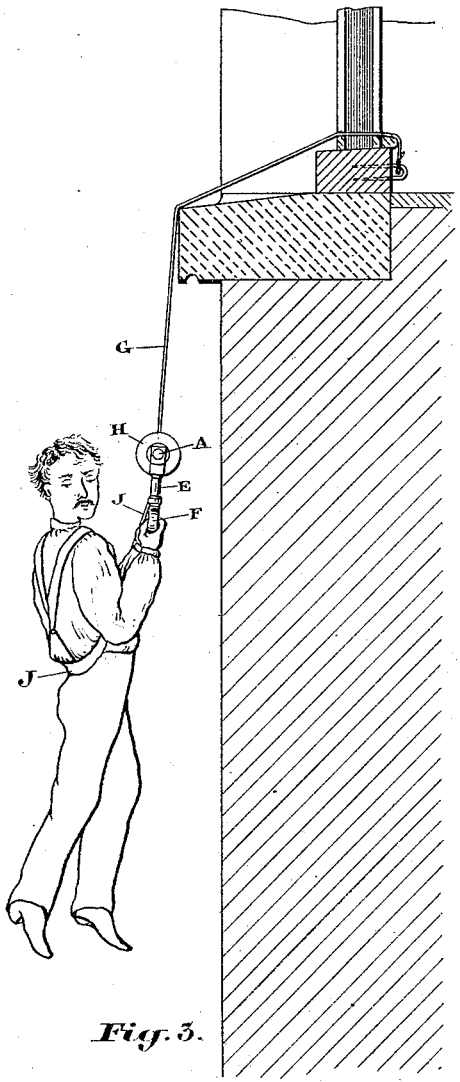

Figure 1 is an elevation and part section of my device. Figs. 2 and 3 are views showing different methods of applying the same.

In the drawings, A is a spindle carried in bearings B, formed on the ends of the arms C.
These arms are hollow, so as to receive the friction-blocks D, one end of which butts against the spindle A, the opposite end of each friction-block D being acted upon by the screwed plunger E, which plunger, as shown, is screwed into the end of each arm C, opposite to that on which the bearing E is formed. It will thus be seen that by screwing the plungers E into the arms C the friction-blocks D are pressed against the axle A. Therefore the power required to revolve the spindle A in its bearing will be in proportion to the pressure exerted by the plunger E upon the friction-block D.

F are handles to the plungers E, by which the said plungers may be screwed in or out of the arm C, as required.

G is a plain wire chain or rope wound around the spindle A, preferably held in the center of the spindle by the flanges H, placed on the spindle A, and designed to form the spool shown.

I is a cross-bar, arranged to brace and hold together the arms C, as indicated. There are several ways in which my device may be used.
For instance, the end of the wire G might be securely fastened to the window-sill or other convenient place, when the party desiring to descend grasps the handles F, and, after adjusting the plungers E against the friction-blocks D, so as to cause sufficient friction on the bearings of the spindle A to retard the movement of the said spindle in proportion to his weight, he can gradually descend from the window, holding on to the handles F; or, if necessary, an additional supporting wire or rope, J, extending from the bar I, can be provided, terminating in a belt around the body suspended.

In Figs. 2 and 3 I illustrate the application of my device. In Fig. 3 a man is shown grasping the handles F, and having around his waist a belt attached to the wire or rope support J, attached to the bar I. (Not seen in this figure.) In Fig. 2 I illustrate the application of my device when the party desiring to descend grasps the wire G, friction in this case on the spindle A being regulated by a party remaining in the room. In such an application the wire or rope J is firmly fixed to some convenient point in the room, the operation of the spindle A being the same in both applications.

As there are various ways of fixing the end of the wire in the room, it is not necessary for me to explain it here, my present invention relating purely to the device for lowering the body; nor is it necessary to explain the various cases in which my device would be applicable.

What I claim as my invention is—

1. A rotating spindle carried in bearings formed on hollow arms, provided with adjustable blocks arranged in said hollow arms, and adapted to be pressed against the said spindle for the purpose of retarding its movement, substantially as and for the purpose specified.

2. A rotating spindle carried in bearings provided with adjustable friction-blocks arranged in hollow arms, as described, in combination with screws arranged to press the friction-blocks against the spindle for the purpose of retarding its movement, substantially as and for the purpose specified.

3. A spindle, A, carried in bearings B, formed on the end of the hollow arms C, and having a wire rope or chain, G, wound around it, as specified, in combination with the friction-blocks D, butting against the spindle A, and actuated by the plungers E, which are provided with the handles F, substantially as specified.

4. A wire rope or chain, G, attached to a spindle, A, carried in bearings B, formed on the end of the hollow arms C, which arms are provided with screwed plungers E, in combination with the cross-bar I, having attached to it the supporting-wire J, and connected with the arms C for the purpose of bracing the arms, substantially as shown and specified.

J. H. LONG.

Witnesses:
RETTA LONG,
L. A. LONGSTREET.